Nov. 12, 1940.  H. J. HOOD  2,221,024
FILM BOX FOR MINIATURE FILM
Filed May 3, 1939
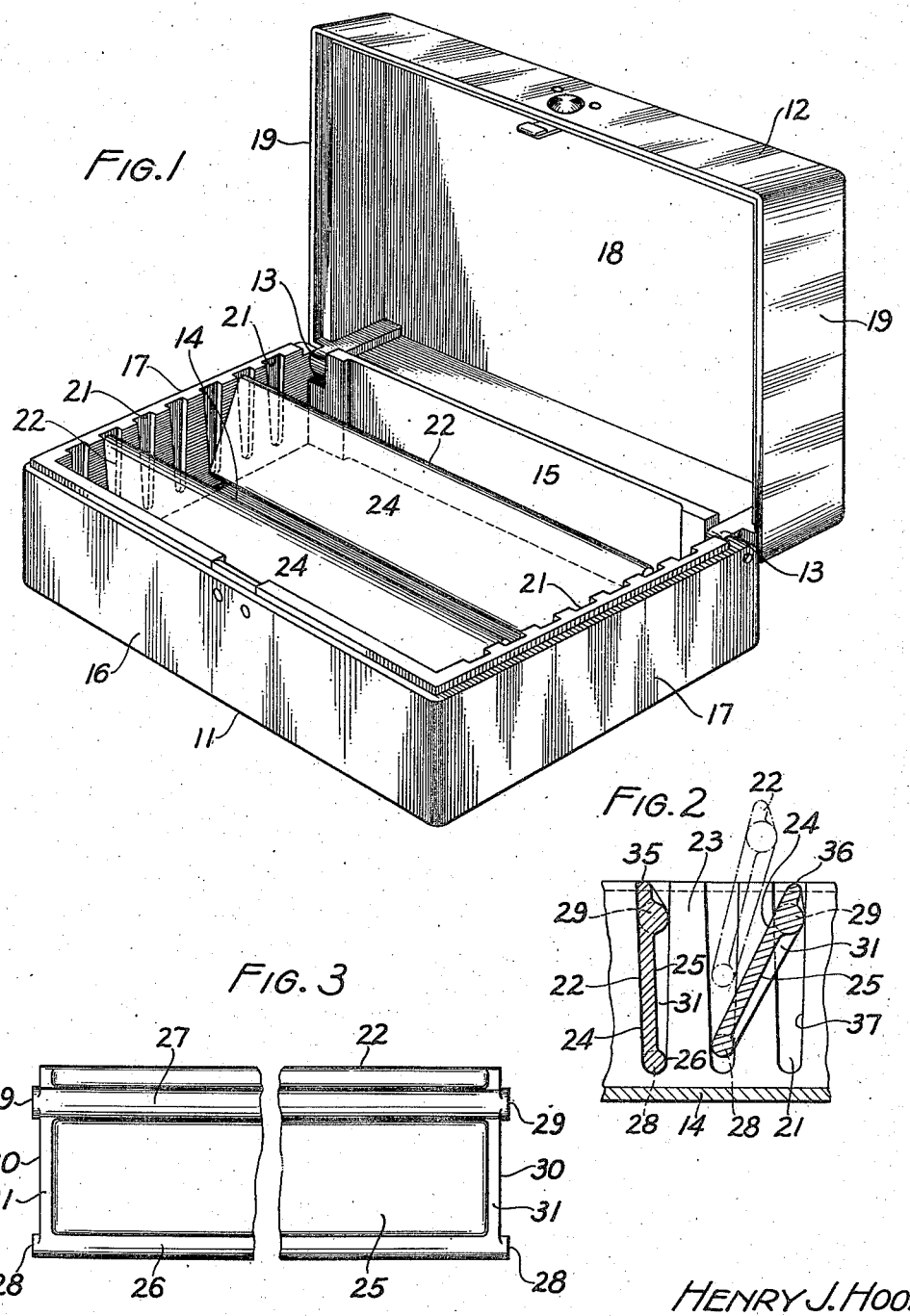
HENRY J. HOOD
INVENTOR
BY
ATTORNEYS Patented Nov. 12, 1940

2,221,024

UNITED STATES PATENT OFFICE 2,221,024

FILM BOX FOR MINIATURE FILM

Henry J. Hood, Rochester, N. Y., assignor to Eastman Kodak Company, Rochester, N. Y., a corporation of New Jersey Application May 3, 1939, Serial No. 271,537

3 Claims. (Cl. 129—16)

The present invention relates to a novel form of film box for miniature film, and has as one of its objects the provision of a box of this class in which the miniature films may be suitably filed and indexed in strip form, each strip containing a plurality of image areas.

Another object of the invention is the provision of a new and improved form of partition members which divides the interior of the box into a plurality of film receiving compartments or pockets.

And still another object of the invention is the provision of separate partition members which may be selectively positioned to provide either vertically or inclined film receiving pockets, or both.

Yet another object of the invention is the provision of a miniature film box which is simple in construction, relatively inexpensive to manufacture, and highly effective in use.

To these and other ends, the invention resides in certain improvements and combinations of parts all as will be hereinafter more fully described, the novel features being pointed out in the claims at the end of the specification.

In the drawing:

Fig. 1 is a perspective view of a film box for miniature film constructed in accordance with the present invention, showing the cover in raised position to more clearly disclose the arrangement of the various partition members within the box;

Fig. 2 is a sectional view to a portion of the box illustrated in Fig. 1, showing various arrangements of the partition members in the box to provide inclined or vertical film receiving pockets; and Fig. 3 is a rear elevation view of the preferred form of partition members for dividing the interior of the box into a plurality of film receiving pockets or compartments.

Similar reference numerals throughout the various views indicate the same parts.

Miniature films are usually supplied in rolls of a large number of exposures, usually 18 or 36. These films, after being processed either to a positive or negative, are returned to the customer in a continuous strip which is wound into a roll. In order to subsequently view the various image areas, it is obviously necessary for the owner to unwind the roll. Such unwinding may fingermark or scratch the film, such marking or scratching being highly undesirable, particularly in the case of color positive film such as "Kodachrome," as is apparent to those in the art. In order to overcome these disadvantages, it has been found desirable to separate the strip of 18 or 36 exposures into sections of say four image areas each. Of course, any other suitable number of image areas may be selected. Each of these separate strips are then inserted into a long tubular envelope or covering of thin transparent material, such as paper. These envelopes not only protect the separate strips from becoming marred or scratched, but, being transparent, permit easy viewing of the image areas without necessitating removal of the strips from their protective covering. As these envelopes are of standard and well-known construction, and do not constitute any part of the present invention, a showing thereof is not deemed necessary to a full understanding of the present invention.

These separate envelopes with their film strips may then be filed in a suitable container. In filing these films, it is often desirable to file related subjects together so that they may be easily and readily located when desired. To this end, the present invention provides a film box the interior of which is divided into a plurality of film receiving pockets or compartments of such size as to receive the separate strips with their protective envelopes. If desired, the various pockets may be provided with suitable index cards, not shown, to designate the subject matter of the films in each pocket. For example, one pocket may be labeled, "Marine Scenes," another pocket may be labeled, "Snow Scenes," while still another pocket may be labeled, "Vacation Scenes," etc. Thus a wide variety of arrangements may be secured, the particular titles depending on the individual. By means of such an arrangement, the various films may be suitably filed and indexed for ready use, yet are protected against scratching and marring, the advantages of which are apparent.

The film box of the present invention may be made of any suitable material, such as a plastic or wood, to provide a lower box-like receptacle 11 and a top or closure portion 12 hinged at 13 to the receptacle 11. The latter is formed to provide a bottom 14, a back 15, a front wall 16, and opposite sides 17. The top or closure member 12 is arranged to overlie the receptacle 11 and is formed with a top 18 and depending side walls 19 which are arranged to rest on and to be supported by the walls of the receptacle 11 when the top member is in closed position, as will be apparent from an inspection of Fig. 1. The opposite walls 17 are formed with a plurality of aligned downwardly tapered slots or grooves 21 adapted to receive and support partition members, generally indicated by the numeral 22 and to be later more fully described, which divide the interior of the receptacle 11 into a plurality of film receiving pockets or compartments 23.

Each partition member 22 is formed of any suitable material to provide a thin flat member which extends substantially the full width of the receptacle 11, as clearly shown in Fig. 1. The front face 24 of each partition member 22 is flat, as best shown in Fig. 2, while the rear space 25 is formed with a lower longitudinal rib 26 and slightly larger upper longitudinal rib 27. The ribs 26 and 27 extend the full length of the member 22 and project laterally therebeyond to provide pairs of short cylindrical lugs 28 and 29 respectively, as best shown in Fig. 3. The opposite side edges 30 of the member 22 are also formed with vertical marginal reenforcing ribs 31 which cooperate with the ribs 26 and 27 to strengthen and reenforce the member 22 so as to insure proper alignment of the laterally extending lugs 28 and 29.

The various partition members 22 may be arranged in aligned grooves 21 in the opposite walls 17 to provide vertical partition members, as shown at 35, Fig. 2. When in this position, the member 22 is supported in a single pair of aligned grooves in the sides 17 so that the lugs 28 and 29 on each end of the member are positioned in the same groove, as shown at the left, Fig. 2. If desired, the member 22 may be arranged in inclined position to provide a sloping partition member, as shown at 36, Fig. 2. When in this inclined position, the lower pair of lugs 28 extend into a pair of aligned grooves 21, while the upper pair of lugs 29 are positioned in an adjacent pair of grooves, as clearly shown at the right in Fig. 2. Thus when in the vertical position, each member 22 is supported in a single groove on each side wall 17 of the receptacle 11, and when in the inclined position, it is supported in a pair of grooves on each side 17, as clearly shown in Fig. 2. In both cases, only the lugs 28 and 29 extend into the grooves 21 and engage the side edges 37 thereof and thus provide the sole means of supporting and positioning the member 22 within the receptacle 11 and above the bottom 14 thereof. As the grooves 21 are tapered, the upper pair of lugs 29 are made slightly larger than the lower lugs 28 to accommodate the larger width in the upper end of the grooves.

While the various partition members 22 may be selectively arranged in either the vertical or inclined position, see Fig. 2, it may be desirable to change the arrangement of some or all of these members. To secure this result, the member to be changed is lifted up so that the upper pair of lugs 29 thereof are removed from the opposite grooves 21, as shown in broken line in Fig. 2. The member 22 is then swung about the lugs 28 as pivots to bring the upper lugs 29 into proper position. The member 22 is then lowered to bring the lugs 29 into the desired grooves. The lower lugs 28 thus not only cooperate with the upper lugs 29 to support the partition member 22 in the receptacle 11, but also provides pivots whereby the member may be readily swung from one position to the other. The lower pair of lugs 28 may, therefore, be broadly considered as a means of pivotally mounting the lower end of the partition member in aligned grooves to permit the member to be moved to bring the upper and lower lugs into the same groove to afford vertical partition members, or to position the lugs in an adjacent pair of grooves to provide an inclined partition member.

The present invention thus provides a film receptacle the interior of which may be suitably divided into a number of film receiving pockets or compartments. These pockets are formed by a plurality of separate and removable partition members which may be so arranged as to provide either vertical or inclined pockets. Furthermore, these various partition members may be so arranged as to provide compartments of varying size.

While one embodiment of the invention has been disclosed, it is to be understood the inventive idea may be carried out in a number of ways. This application is therefore not to be limited to the precise details described but is intended to cover all variations and modifications thereof falling within the spirit of the invention and the scope of the appended claims.

I claim:

1. A container for miniature films comprising a box-like receptacle having opposite sides formed with grooves, a removable partition member positioned within said receptacle and extending thereacross to divide the interior thereof into separate film receiving pockets, and a pair of laterally extending lugs formed on each end of said member, the lugs of each pair being removably positioned in adjacent slots to support said member in inclined position within said receptacle.

2. A container for miniature films comprising a box-like receptacle having opposite sides formed with grooves, a removable partition member positioned within said receptacle and extending thereacross to divide the interior thereof into separate film receiving pockets, a pair of laterally extending lugs formed on each end of said member and extending into said grooves to both position and support said member, the lower lugs of said pairs pivotally mounting the lower end of said member in aligned grooves whereby said member may be selectively moved to bring the lugs of each pair into the same groove to provide a vertical partition or to position the lugs of each pair in adjacent grooves to afford an inclined partition.

3. A container for miniature films comprising a box-like receptacle having opposite sides formed with downwardly tapered grooves, a removable partition member positioned within said receptacle and extending thereacross to divide the interior thereof into separate film receiving pockets, a pair of short cylindrical lugs projecting from the opposite ends of said member adjacent the top thereof, and a pair of cylindrical lugs of less size than said first lugs projecting from the opposite ends of said member adjacent the bottom thereof, said pairs of upper and lower lugs being adapted to be slidably positioned in the tapered grooves on opposite sides of said container and being of such size as to frictionally engage the tapered sides of said grooves so as to afford the sole means for supporting said member at its end edges only and for positioning said member in said receptacle, said pair of lower lugs also affording a pivotal mounting for said member so that the latter may be selectively moved to position the pairs of lugs at the opposite ends of said member in aligned grooves to provide a vertical partition or to position the pairs of upper and lower lugs in adjacent pairs of aligned grooves to afford an inclined partition.

HENRY J. HOOD.